(12) United States Patent
Vetelino

(10) Patent No.: US 7,075,216 B1
(45) Date of Patent: Jul. 11, 2006

(54) LATERAL FIELD EXCITED ACOUSTIC WAVE SENSOR

(75) Inventor: John F. Vetelino, Veazie, ME (US)

(73) Assignee: University of Maine System Board of Trustees, Bangor, ME (US)

( * ) Notice: Subject to any disclaimer, the term of this patent is extended or adjusted under 35 U.S.C. 154(b) by 21 days.

(21) Appl. No.: 10/814,921

(22) Filed: Mar. 31, 2004

(51) Int. Cl.
*H01L 41/07* (2006.01)
*H04R 17/00* (2006.01)

(52) U.S. Cl. .............. 310/338; 310/334; 310/336; 310/365; 310/333

(58) Field of Classification Search .......... 310/333, 310/334, 336, 337, 340, 341, 365, 360–361, 310/366, 338
See application file for complete search history.

(56) References Cited

U.S. PATENT DOCUMENTS

| | | | | |
|---|---|---|---|---|
| 4,361,026 A | * | 11/1982 | Muller et al. .............. 73/24.01 |
| 5,233,259 A | * | 8/1993 | Krishnaswamy et al. ... 310/366 |
| 5,416,448 A | | 5/1995 | Wessendorf ................ 367/140 |
| 5,455,475 A | | 10/1995 | Josse et al. ............ 310/316.01 |
| 5,719,324 A | * | 2/1998 | Thundat et al. ............ 73/24.01 |
| 5,744,902 A | | 4/1998 | Vig ............................ 310/360 |
| 5,852,229 A | | 12/1998 | Josse et al. .................. 73/24.6 |
| 5,869,763 A | | 2/1999 | Vig et al. ...................... 73/580 |
| 6,247,354 B1 | | 6/2001 | Vig et al. .................. 73/64.53 |
| 6,260,408 B1 | | 7/2001 | Vig et al. .................. 73/54.41 |
| 6,293,136 B1 | | 9/2001 | Kim .......................... 73/19.03 |
| 6,526,835 B1 | * | 3/2003 | Hage .......................... 73/778 |
| 6,755,073 B1 | * | 6/2004 | Jakoby et al. ............. 73/54.41 |
| 6,903,626 B1 | * | 6/2005 | Tsutsumi et al. ........... 333/133 |
| 2003/0076743 A1 | | 4/2003 | Thompson et al. ......... 367/140 |
| 2005/0003560 A1 | * | 1/2005 | Zeng et al. ................. 436/527 |
| 2005/0039532 A1 | * | 2/2005 | Ohsugi et al. ................ 73/580 |
| 2005/0103096 A1 | * | 5/2005 | Jakoby et al. ............. 73/54.02 |

OTHER PUBLICATIONS

Yihe Hu et al., A Lateral Field Excited Liquid Acoustic Wave Sensor, paper presented at the 2003 IEEE International Ultrasonics Symposium, Oct. 5-8, 2003, Honolulu, Hawaii.

* cited by examiner

*Primary Examiner*—Darren Schuberg
*Assistant Examiner*—J. Aguirrechea
(74) *Attorney, Agent, or Firm*—MacMillan, Sobanski & Todd, LLC

(57) ABSTRACT

An acoustic wave sensor having a piezoelectric substrate shaped to generate lateral electric fields. The sensor has a pair of electrodes deposited upon a reference surface of the substrate. A sensing surface that is opposite from the reference surface is adapted to be immersed in an environment, such as a gas or a liquid.

27 Claims, 10 Drawing Sheets

US 7,075,216 B1

LATERAL FIELD EXCITED ACOUSTIC WAVE SENSOR

STATEMENT REGARDING FEDERALLY SPONSORED RESEARCH OR DEVELOPMENT

Research sponsored by Maine Sea Grant/NOAA No. NA16RG1034 and by National Science Foundation Grant No. EEC9820332.

CROSS-REFERENCE TO RELATED APPLICATIONS

Not Applicable

REFERENCE TO A SEQUENCE LISTING, A TABLE, OR A COMPUTER PROGRAM LISTING COMPACT DISC APPENDIX

Not Applicable

BACKGROUND OF THE INVENTION

This invention relates in general to acoustic wave sensors and in particular to a lateral field excited acoustic wave sensor.

Piezoelectric materials, such as crystalline quartz, generate an electric field or voltage when subjected to mechanical stress and, conversely, generate mechanical stress when subjected to an electric field or voltage. Accordingly, piezoelectric materials have proven useful in many diverse technologies. Typically, electrodes are deposited upon the surface of the crystal and an AC voltage is applied to the electrodes to generate an electric field in the crystal. The electric field, in turn, generates mechanical stresses in the crystal. If the applied AC voltage is at or near the resonant frequency of the crystal, a resonant acoustic wave is excited within the crystal. At the resonant frequency, which is determined by the cut angle, thickness, length, width and mass of the crystal, the acoustic wave may propagate and resonate within the crystal with very little loss.

A measure of how narrow a band of frequencies can be passed through a particular piezoelectric crystal with minimum attenuation relative to the resonant frequency of the crystal is referred to as the Q of the crystal. The Q of the crystal, which is a function of the crystalographic orientation of the crystal, determines the specific application for the crystal. For example, very low Q crystals are capable of converting wide frequency bands of mechanical energy to electrical energy; and, conversely, wide frequency bands of electrical energy to mechanical energy. Thus, low Q materials are often used as sonic transducers in microphones or speakers because the low Q allows many tones to be produced. With a very high Q material, only a very narrow band of frequencies may be passed through the crystal. Thus high Q material is typically used in devices that require highly accurate frequency control, such as oscillators.

High Q piezoelectric materials also are used in sensors. With modern manufacturing methods, precision crystals of quartz or other similar very high Q material may be made to oscillate at a frequency that is accurate to within a few parts per million or less. During production of such quartz resonators, layers of conductive electrode material may be deposited with a precision of a few atomic layers. The resonant frequency of the resulting resonators will be sensitive to extremely small changes in the mass of the electrodes. This characteristic sensitivity of high Q piezoelectric materials to changes in mass has led to a number of diverse sensor applications. For example, a quartz resonator may be coated with a sorbent which is selective to a particular compound. The amount, or concentration, of the compound can then be determined by monitoring the change in the resonant frequency of the quartz crystal as the compound is absorbed by the sorbent since, as the compound is absorbed, the mass of the sorbent and, hence, the total mass of the vibrating structure increases. Because the addition or subtraction of mass to the piezoelectric material results in a change of the resonant frequency of the crystal, such devices are commonly referred to as a Quartz Crystal Microbalances (QCM's) and are widely used in applications where a change in mass, density or viscosity is monitored, such as in sensing applications.

Referring now to the drawings, a typical known QCM sensor is illustrated generally at 10 in FIGS. 1 and 2. The sensor 10 includes a disc shaped substrate 12 of quartz having a diameter of approximately 25 mm. The standard crystallographic orientation used is an AT-cut since it is a temperature stable orientation in which only a Transverse Shear Mode (TSM) acoustic wave can be excited. Other orientations in quartz in which only a TSM acoustic wave can be excited also may be utilized. FIG. 1 shows the reference surface 14 of the substrate while FIG. 2 shows the sensing surface 16 of the substrate 12 that is opposite from the reference surface 14. A disc shaped reference electrode 18 formed from an electrically conducting material and having a diameter of approximately 6 mm is deposited upon the center of the reference surface 14. The electrode 18 is formed from an electrically conductive metal. The reference electrode 18 is connected by a first strip 20 of conductive material to an arcuate reference electrode tap 22. The reference electrode tap 22 allows electrical connection to an external sensing circuitry (not shown). The electrical connection is illustrated by a wire lead 24; however, the lead 24 is intended to be exemplary and other types of conventional electrical connections may be utilized.

As shown in FIG. 2, a disc shaped sensing electrode 26 formed from an electrically conductive metal and having a diameter of approximately 13 mm is deposited upon the center of the sensing surface 16. A second strip of conductive material 28 extends from the sensing electrode 26 to the edge of the sensing surface 16, transversely across the side of the substrate 12 and onto the reference surface 14, as shown in FIG. 1, where it ends in an arcuate sensing electrode tap 30. Similar to the reference electrode tap 22, the sensing electrode tap 30 allows electrical connection to the external sensing circuitry (not shown), as illustrated by a wire lead 32. Additionally, an adhesive layers 33 and 34 are typically deposited between the electrodes, 18 and 26, and the corresponding substrate surface, 14 and 16, respectively, to enhance adherence of the electrodes to the substrate surface. Finally, depending upon the application, a sorbent selective film (not shown) may cover the sensing surface 16.

During operation of the sensor 10, a variable frequency oscillator (not shown) is electrically connected to the reference and sensing electrode taps, 22 and 30, and the sensing surface 16 is inserted into an environment, which may be either a gas or a liquid, while the reference surface 14 remains exposed to air. The environment contains a measurand, which is a specific property of the environment that is being sensed by the sensor, such as, for example the concentration of a certain substance within a gas or liquid. Thus, when the sensing surface 16 is inserted into an environment, the sensing surface is exposed to a specific measurand contained within the environment. Should the sensing surface be covered by a sorbent film, the sorbent film also is immersed in the environment. The oscillator applies a varying voltage to the electrodes, 18 and 26, which then generate acoustic waves within the substrate 12. Such a mode of operation is referred to as Thickness Field Excitation (TFE). Before exposing the sensing surface 16 to the measurand the sensor 10 is calibrated by varying the oscillator frequency to resonate the sensor 10. The resonance frequency is detected and stored in a conventional device or circuit (not shown). After calibration, the sensing surface is inserted into the environment being monitored. The effect of mechanical loading properties of the measurand, such as mass, density and viscoelasticity, upon the sensing surface 16 causes the resonant frequency of the sensor to shift. The shift in resonant frequency can be calibrated to be indicative of the magnitude of a specific mechanical loading property of the measurand.

Alternate embodiments of the QCM sensor 10 having different sensing electrodes are illustrated in FIGS. 3 through 5. FIG. 3 illustrates small electrode geometry with a very small circular sensing electrode 35. A typical diameter for the sensing electrode 35 would be about 0.8 mm. In FIG. 4, a closed ring geometry sensing electrode 36 that has an aperture formed through the center of the electrode disc is shown, while FIG. 5 illustrates an open ring sensing electrode 38. The open ring electrode 38 is very similar to the closed ring electrode 36, except that the open ring electrode 38 has a slot 40 extending through the ring that corresponds to the tap region of the reference electrode. Both the closed and open ring electrodes 36 and 38 have an outside diameter of approximately 13 mm and an inside diameter of approximately 11 mm. All of the sensors shown in FIGS. 4 through 5 have a reference surface configuration that is similar to the sensor 10 shown in FIG. 1.

The use of conventional QCM sensors, such as the one shown in FIGS. 1 and 2, is limited to applications where measurand electrical properties such as permittivity and conductivity change in addition to changes in the mechanical properties listed above. In many applications, the measurement of changes in the electrical properties is critical. However, with conventional QCM sensors, such as the one shown in FIGS. 1 and 2, the sensing electrode 26 that contacts the measurand is the same size or larger than the reference electrode 18 that contacts air. Because of its size, the sensing electrode 26 shields most of the TSM electric field, preventing the penetration of the field into the measurand. Thus, a conventional QCM sensor has minimal sensitivity to changes in electrical properties of the measurand. The modified sensing electrode geometries shown in FIGS. 3 through 5 reduce the size of the sensing electrode. As a result, a small shift of the resonant frequency of the modified QCM sensors may be detected as the electrical properties of the measurand changes. However, it is desirable to provide a piezoelectric sensor with greater sensitivity to the mechanical and electrical properties of the measurand.

BRIEF SUMMARY OF THE INVENTION

This invention relates to a lateral field excited acoustic wave sensor.

The present invention contemplates an acoustic wave sensor that includes a substrate formed from a piezoelectric crystal. The substrate has a sensing surface that is adapted to be immersed in a medium or environment that contains a measurand of interest and a reference surface that is opposite from the sensing surface. The sensing surface may be either bare or covered with a film that will absorb the measurand from the environment. The sensor also includes a pair of electrodes deposited upon the substrate reference surface that are separated by a gap and are operative to generate transverse shear mode acoustic waves within the substrate. The sensor further includes an adhesive layer deposited between the electrodes and the substrate reference surface.

The invention also contemplates a method for fabricating the acoustic wave sensor described above. The method includes providing a piezoelectric crystal, such as quartz, langatate, langasite, langanite, lithium tantalate or lithium niobate. The crystal is formed into a substrate having a reference surface and a sensing surface opposite from the reference surface with the sensing surface being adapted to be immersed in an environment in which a measuand of interest is located. The sensing surface may be either bare or covered with a film that will absorb the measurand from the environment. An adhesive layer is deposited upon the reference surface of the sensor substrate following which a pair of electrodes formed from a electrically conductive metal, such as gold, platinum, palladium, silver, copper or aluminum are deposited upon the reference surface of the sensor substrate over the adhesive layer.

The invention further contemplates an apparatus for measuring a characteristic of a liquid that includes an acoustic wave sensor having a piezoelectric substrate. The substrate is formed from one of the group of quartz, langatate, langasite, langanite, lithium tantalate and lithium niobate, and has a reference surface and a sensing surface opposite from the reference surface with the sensing surface being adapted to be immersed in a liquid. The sensor also has a pair of electrodes deposited upon the substrate reference surface of said substrate.

The apparatus also includes a voltage supply electrically connected to the sensor electrodes. The voltage supply has a variable frequency and is operative to sweep through a predetermined frequency range. The voltage supply also is operative to cause the electrodes to generate a lateral electric field that excites transverse shear mode acoustic waves within the substrate reference surface. The transverse shear mode acoustic waves produce electric fields that extend into the substrate sensing surface and into an environment of interest.

The apparatus further includes a detection device electrically connected to the sensor that is operative to detect the resonance frequency of the sensor. The detection device is further operative to detect shifts in the resonant frequency as a property of a the measurand at or near the sensor sensing surface varies and to correlate the resonant frequency shift with the variation of the measurand property.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
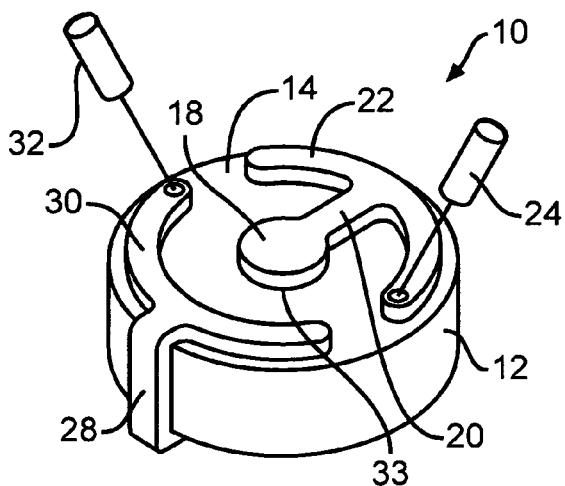
FIG. 1 is a perspective view of the reference surface of a known Quartz Crystal Microbalance (QCM) sensor.
Figure 2:
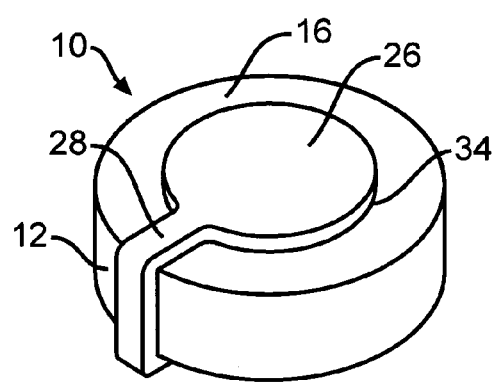
FIG. 2 is a perspective view of the sensing surface of the known QCM sensor shown in FIG. 1.
Figure 3:
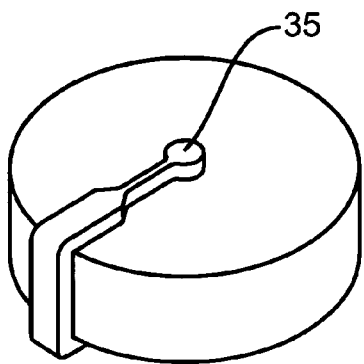
FIG. 3 is a perspective view of an alternate embodiment of the sensing surface of the known QCM sensor shown in FIG. 1.
Figure 4:
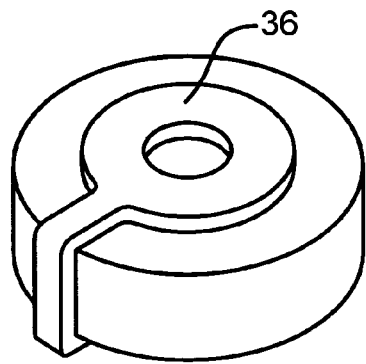
FIG. 4 is a perspective view of another alternate embodiment of the sensing surface of the known QCM sensor shown in FIG. 1.
Figure 5:
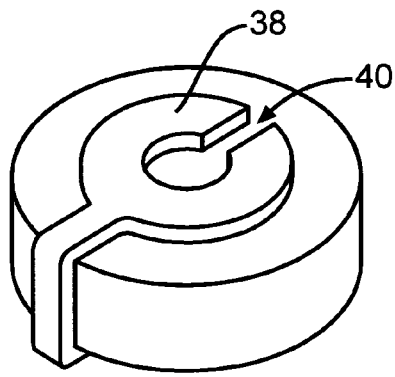
FIG. 5 is a perspective view of another alternate embodiment of the sensing surface of the known QCM sensor shown in FIG. 1.
Figure 6:
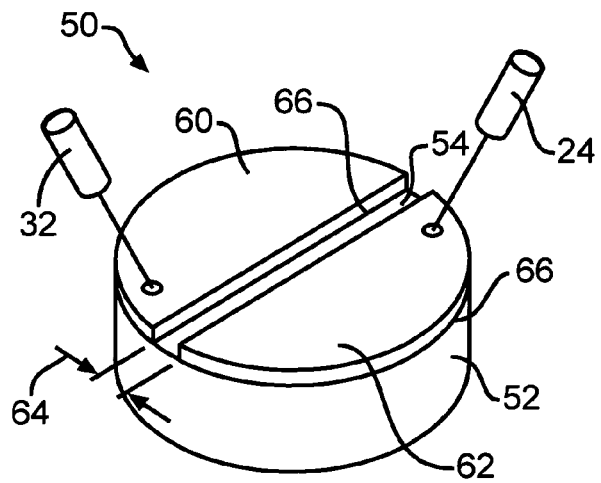
FIG. 6 is a perspective view of the reference surface of a Lateral Field Excited (LFE) acoustic wave sensor that is in accordance with the invention.
Figure 7:
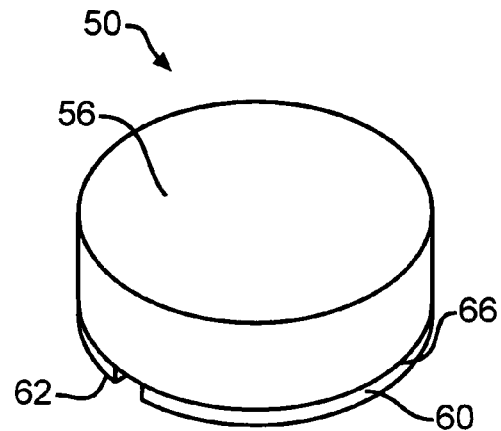
FIG. 7 is a perspective view of the sensing surface of the LFE sensor shown in FIG. 6.

Referring again to the drawings, there is illustrated in FIGS. 6 and 7 a lateral field excited liquid acoustic sensor 50 that is in accordance with the invention. The sensor 50 includes a disc shaped substrate 52. In the preferred embodiment, AT-cut quartz crystal is used for the substrate. However, any crystal with a corresponding crystographic orientation that is capable of exciting only a Transverse Shear Mode (TSM) acoustic wave may be used, such as, for example, a crystal selected from the LGX family of crystals also may be utilized. The LGX family of crystals are materials of the trigonal crystal class 32, which is the same crystal class as quartz. The LGX family of crystals includes langatate (LGT, $La_3Ga_{5.5}Ta_{0.5}O_{14}$), langasite (LGS, $La_3Ga_5SiO_{14}$), langanite (LGN, $La_3Ga_{5.5}Nb_{0.5}O_{14}$), and variations, such as LGTS ($La_3Ga_{5.25}Ta_{0.25}Si_{0.5}O_{14}$) and LGZS ($La_3Ga_5Zr_{0.5}Si_{0.5}O_{14}$). Additionally, the substrate also may be formed from Lithium Tantalate ($LiTaO_3$) or Lithium Niobate ($LiNbO_3$). If one of the alternate crystals is used for the substrate, it would be cut with the surfaces oriented with respect to the crystal axes such that only the TSM acoustic waves would be excited by the sensor electrodes. Also in the preferred embodiment, the substrate is approximately 0.5 mm thick and 25 mm in diameter; although the invention also may be practiced with substrates having a different thickness and/or diameter. For example, the invention contemplates that the substrate thickness would be within a range of approximately 0.3 mm to 1.0 mm. Additionally, the substrate may have a different shape than that which is shown in FIGS. 6 and 7, such as, for example, square, rectangular, polygonal or elliptical. One circular surface of the substrate 52 is the reference surface 54 of the sensor 50, while the opposite circular surface is the sensing surface 56.

A pair of electrodes 60 and 62 that are separated by a gap 64 are deposited upon the reference surface 54 of the substrate 52 by a conventional photolithography process. The electrodes 60 and 62 are formed from an electrically conductive material, such as metal. In the preferred embodiment, a noble metal, such as gold, palladium or platinum, is used for the electrodes 60 and 62, because noble metals do not oxidize, thus maintaining their conductivity. However, other metals, such as silver, copper or aluminum also could be used to form the electrodes. As illustrated in FIG. 6, the electrodes are shaped as a sector of a circle; however the electrodes 60 and 62 may have other shapes than what is shown. In the preferred embodiment, the electrode thickness is usually between 1,500 and 2,500 Å thick; however, the thickness also may be less than 1,500 Å. The electrodes 60 and 62 are oriented upon the substrate reference surface 54 such that the facing edges of the electrodes are parallel with the crystallographic x-axis of the substrate 52. The orientation of the electrodes results in an electric field that will only excite the TSM acoustic wave. In the preferred embodiment the width of the gap 64 is between 1.5 mm and 3.5 mm; however, other widths also may be used.

An adhesive layer 66 is disposed between the electrodes 60 and 62 and the substrate reference surface 54. The adhesive layer 66, which in the preferred embodiment is a layer of chromium that is about 100 Å thick, enhances the adherence of the electrodes 60 and 62 to the surface of the substrate 52. Alternately, other materials, such as, for example zirconium or titanium also may be utilized to form the adhesive layer 66. The adhesive layer is applied to the substrate 52 by a conventional method before the electrodes are deposited thereupon. While the adhesive layer in the preferred embodiment has a thickness of 100 Å, the invention also may be practiced with an adhesive layer thickness that is within the range of 50 to 150 Å.

A pair of electrically conductive wires 24 and 32 are shown electrically connected to the electrodes 60 and 62. While the electrical connection is illustrated by a pair of wires 24 and 32, the electrical connections are intended to be exemplary and other types of conventional electrical connections may be utilized, such as, for example, wire bonds. The wires 24 and 32 represent electrical connections to external sensing circuitry, as will be explained below.

The operation of the sensor 50 will now be explained. As shown in FIG. 7, there are no electrodes deposited upon the sensing surface 56. When the electrodes 60 and 62 are energized by the oscillator 82, a lateral electric field is established between the electrodes 60 and 62. The lateral electric field excites only a TSM acoustic wave within the substrate 52. The acoustic wave includes both mechanical displacements and electric fields that appear upon the substrate sensing surface 56. The generation of TSM acoustic waves by a laterally oriented electrical field is known as Lateral Field Excitation (LFE). The absence of electrodes upon the sensing surface 56 allows the mechanical and electric fields generated by the TSM acoustic wave to penetrate into the environment containing the measurand of interest that is adjacent to the sensing surface 56. The penetration of the mechanical and electric fields into the environment results in an increased sensitivity to both mechanical and electrical property changes. Additionally, with no electrode in the region of maximum displacement, higher Q values result, as well as improved frequency stability and reduced aging of the sensor.

The present invention also contemplates a method for fabricating the LFE sensor 50. The method is illustrated by the flow chart shown in FIG. 8. In functional block 70 a crystalline piezoelectric material is selected for substrate. As described above, the material is selected from a piezoelectric crystal such as quartz, one of the LGX family of crystals, $LiTaO_3$ or $LiNbO_3$. In functional block 72, the selected crystal is cut at angles relative to its crystalline axes that corresponds to the intended use and resonant frequency. Depending upon the intended use, a cut relative to one crystalline axis, two of the axes or all three or the axes may be used. The substrate is then shaped to its final size and shape, which also are selected with regard to the desired resonant sensor frequency.

In functional block 74, the crystalline substrate reference surface is carefully polished and an adhesion layer is deposited by conventional methods upon the reference surface. Then, in functional block 76, the electrodes are deposited upon the adhesion layer by conventional photolithography techniques.

Figure 8:
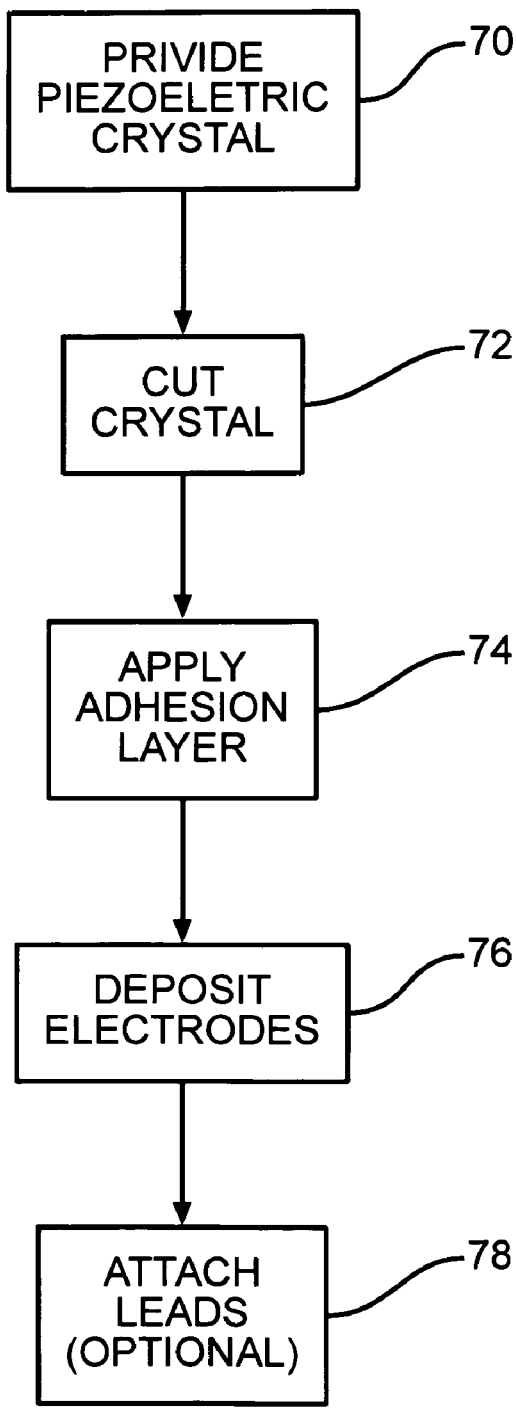
FIG. 8 is a flow chart illustrating a method for fabricating the LFE sensor shown in FIGS. 6 and 7.

As shown in FIG. 8, leads are then attached to the electrodes in functional block 78; however, this step is optional and its inclusion depends upon the method of electrically connecting the sensor to other components. For example, wire bonding may be used, in which case leads would not be needed.

Figure 9:
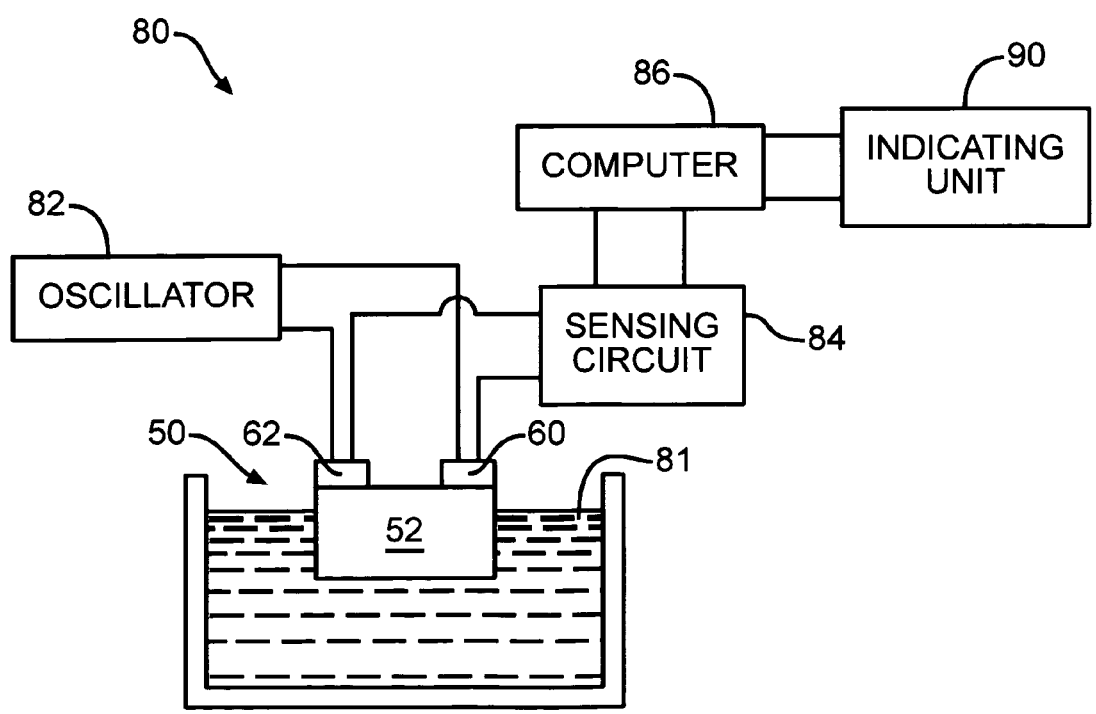
FIG. 9 is a block diagram of a sensing apparatus that includes the LFE sensor shown in FIGS. 6 and 7.

The invention also contemplates an apparatus 80 for measuring electrical characteristics of an environment that includes the LFE sensor 50. A block diagram for the apparatus 80 is shown in FIG. 9 where the sensing surface 56 of the sensor 50 is immersed in an environment 81. While the environment 81 is shown as a liquid in FIG. 9, it will appreciated that the environment also may be a gas (not shown). The apparatus 80 includes a commercially available oscillator 82 that drives the LFE sensor 50 over a range of frequencies spanning all resonant and anti-resonant frequencies. One example of such an oscillator is included in U.S. Pat. No. 5,455,475, which is incorporated herein by reference. A sensing circuit 84 is also connected to the LFE sensor 50. The sensing circuit is operative to sweep a narrow band of frequencies near the series resonance frequency, $f_s$. A variety of known analog or digital circuits, such as an electrical frequency counter, can be utilized as the sensing circuit 84. The sensing circuit 84 is connected to a computer 86 that is operative to determine shifts of the resonant frequency, $f_s$, in response to the exposure of the sensor sensing surface 56 to the measurand contained within the environment 81. While the measurand has been described as being contained within the environment, it will be appreciated that the measuand also may be a characteristic of the evironment, such as, for example the conductivity of a liquid. The computer 86 could be a personal computer, a microprocessor or a Application Specific Integrated Circuit (ASIC). The computer 86 also compares the sensed critical frequencies with stored reference frequencies to determine changes in the measurand. Finally, the apparatus 80 also includes an indicator unit 90 connected to the computer 86. The indicating unit 80 displays results from the computer.

It will appreciated that the apparatus 80 shown in FIG. 9 is intended to be exemplary. Other apparatus that also may used are shown in U.S. Pat. No. 5,852,299 which is incorporated herein by reference.

During operation, the oscillator 82 sweeps a narrow band of frequencies containing the resonant frequency $f_s$. For example, the frequencies swept can be between 4.95 MHz and 5.05 MHz for a LFE sensor having a series resonant frequency $f_s$ of about 5.00 MHz, as for the sensor 50 described above. As the oscillator 82 sweeps the frequency band, the sensing circuit 86 senses, or measures, values of the resonant frequencies and magnitudes and/or phases of the sensor impedance over the frequency range. The sensing circuit 86 also may, depending upon the specific circuit, sense, or measure, magnitudes and/or phases of the sensor admittance over the frequency range to determine the anti-resonant frequencies associated with the admittance. The computer 86 correlates shifts in the resonant frequency with stored data. Additionally, the computer may use the sensed impedance magnitude and/or phase to refine the correlation. The differences or similarities of the sensed data with the stored data is indicative of electrical properties of the measurand. The results of the correlation are then displayed upon the indicator unit 90.

EXPERIMENTAL RESULTS

The inventor fabricated four LFE sensors of the general design shown in FIGS. 6 and 7, but having different electrode gap widths. The LFE gap widths were 1.5 mm, 2.0 mm, 3.0 mm and 3.5 mm. The inventor also procured conventional and modified QCM sensors of the types illustrated in FIGS. 1 through 5. The LFE and QCM sensors were then subjected to various experimental tests as described below. The results of the tests are shown in FIGS. 10 through 15 with the particular sensor identified by coding shown in the following table:

| SENSOR | CODE |
| --- | --- |
| LEF Sensor with 1.5 mm electrode gap | a |
| LEF Sensor with 2.0 mm electrode gap | b |
| LEF Sensor with 2.5 mm electrode gap | c |
| LEF Sensor with 3.5 mm electrode gap | d |
| QCM Sensor with open ring sensing electrode | e |
| QCM Sensor with small sensing electrode | f |
| QCM Sensor with closed ring sensing electrode | g |
| Conventional QCM Sensor | h |

The first test was directed toward liquid conductivity measurements. During the conductivity measurement test NaCl water solutions were used to test each sensors' response to changes in liquid conductivity. Different volumes of 0.5 wt. % of NaCl solutions were added to deionized water with a syringe and a magnetic stirrer was used to mix the solution for five minutes. The conductivity of the solution was then measured with the sensors listed in the above table and it was found that the conductivity increased with each increase in the concentration of NaCl.

Figure 10:
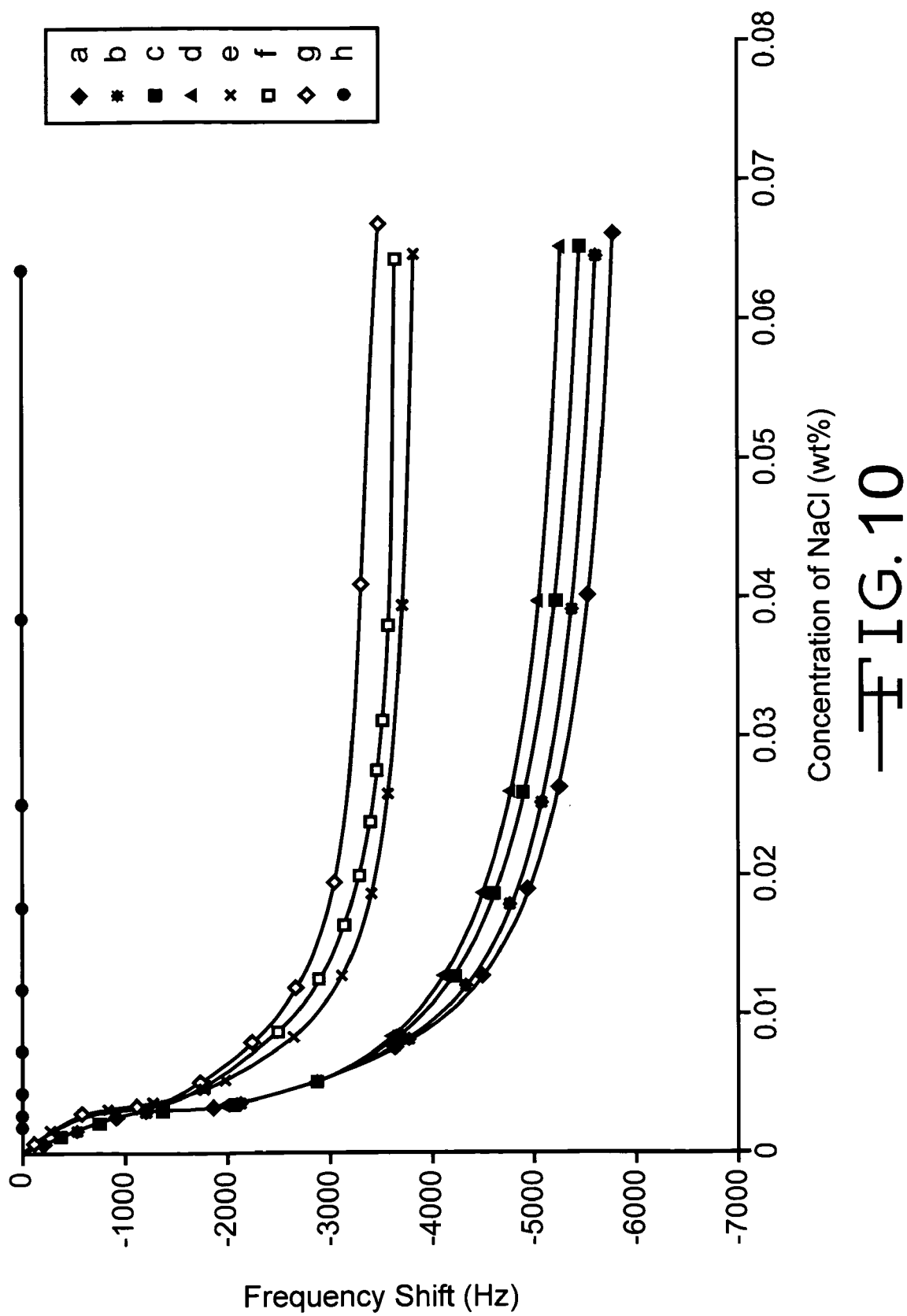
FIG. 10 is a graph illustrating the frequency changes for the QCM and LFE sensors shown in FIGS. 1 through 7 as a function of NaCl concentration in water.

The results of the conductivity measurement test are illustrated in FIG. 10 where the relative frequency shift from the resonant frequency for each sensor is shown as a function of the NaCl concentration in the solution. The upper curve shown in FIG. 10 corresponds to a conventional QCM sensor similar to one shown in FIGS. 1 and 2. The flatness of the curve clearly shows that a conventional QCM sensor is insensitive to changes in liquid conductivity. While FIG. 10 does indicate that the modified QCM sensors shown in FIGS. 3 through 5 exhibit some sensitivity to liquid conductivity, they are less sensitive to changes in liquid conductivity than the LFE sensors. Indeed, the LFE sensors are approximately 1.5 times more sensitive as the the ring and small electrode geometry QCM sensors. This is due to the fact that there is no metal upon the sensing surface 56 of the LFE sensor 50. The absence of metal upon the sensing surface allows maximum penetration of the electric field generated by the LFE sensor into the liquid. In contrast, the presence of a metal electrode upon the sensing surface of the QCM sensors blocks the electric field.

Figure 11:
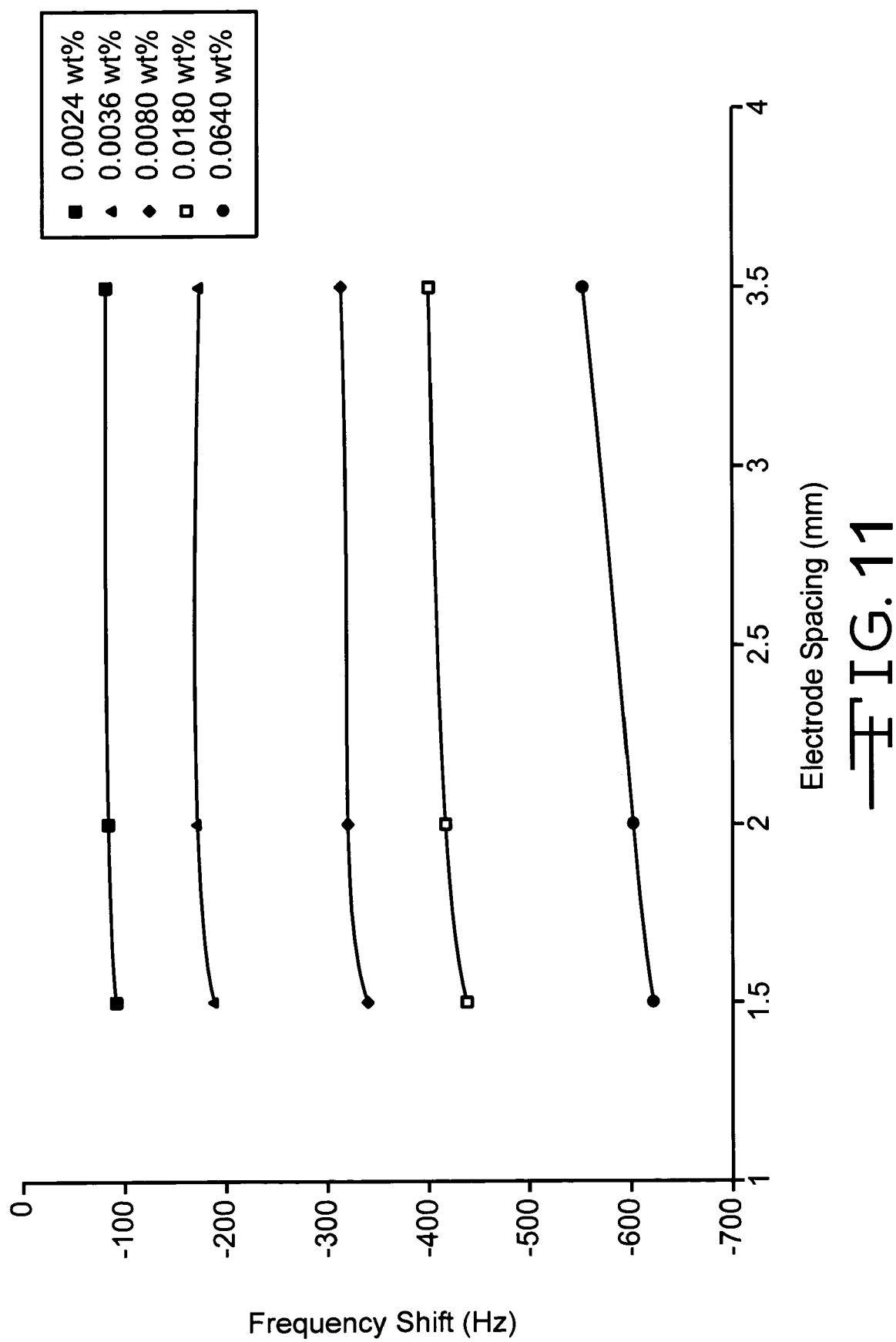
FIG. 11 is a graph illustrating the frequency shift for the LFE sensor shown in FIGS. 6 and 7 as a function of electrode gap spacing for different NaCl concentrations in water.

The inventor also found that the sensitivity to changes in the NaCl concentration increases as the width of the gap 64 between the electrodes 60 and 62 of the four LFE sensors decreases. This is illustrated in FIG. 11, where the NaCl concentration is indicated at the right end of each curve. The increased senistivity is due to the fact that the a smaller gap results in a higher electric field associated with the TSM acoustic wave generated by the LFE sensor 50.

The second test was directed toward liquid relative permittivity measurements. During the relative permittivity measurement test the LFE and QCM sensors were exposed to water solutions containing different amounts of 2-propanol. A 2-propanol water solution was selected for the test liquid because it has a permittivity that varies significantly with the 2-propanol concentration. Different volumes of 2-propanol water solution were added to deionized water with a syringe and a magnetic stirrer was used to mix the solution for 10 to 15 minutes before measuring the permittivity of the solution with the sensors.

Figure 12:
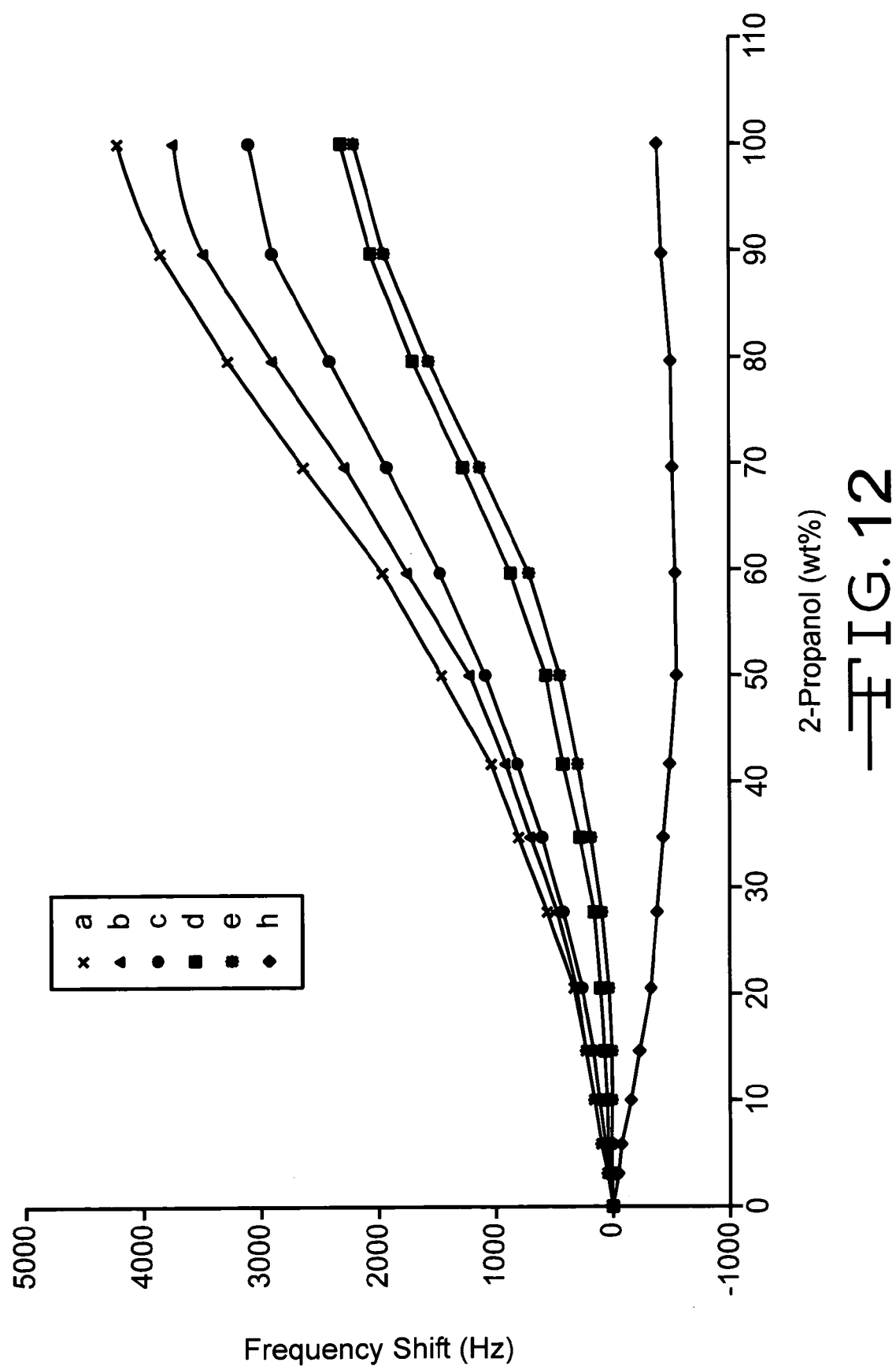
FIG. 12 is a graph illustrating the frequency changes for the QCM and LFE sensors shown in FIGS. 1 through 7 as a function of the concentration of 2-propanol in water.

The sensitivities of the sensors to changes in relative permittivity of a liquid are shown in FIG. 12 where the relative shift of the resonant frequency for each of the sensors as a function of 2-propanol concentration in a solution is shown. It can be seen from FIG. 12 that resonant frequency of the conventional QCM sensor decreased significantly as the concentration of 2-propanol increased while the resonant frequencies of the modified QCM and LFE sensors increased with increases of the 2-propanol concentration. The resonant frequency of the conventional QCM sensor is influenced only by changes in the mechanical properties of the solution while the modified QCM and LFE sensors are influenced by both the liquid mechanical loading and electrical loading.

Figure 13:
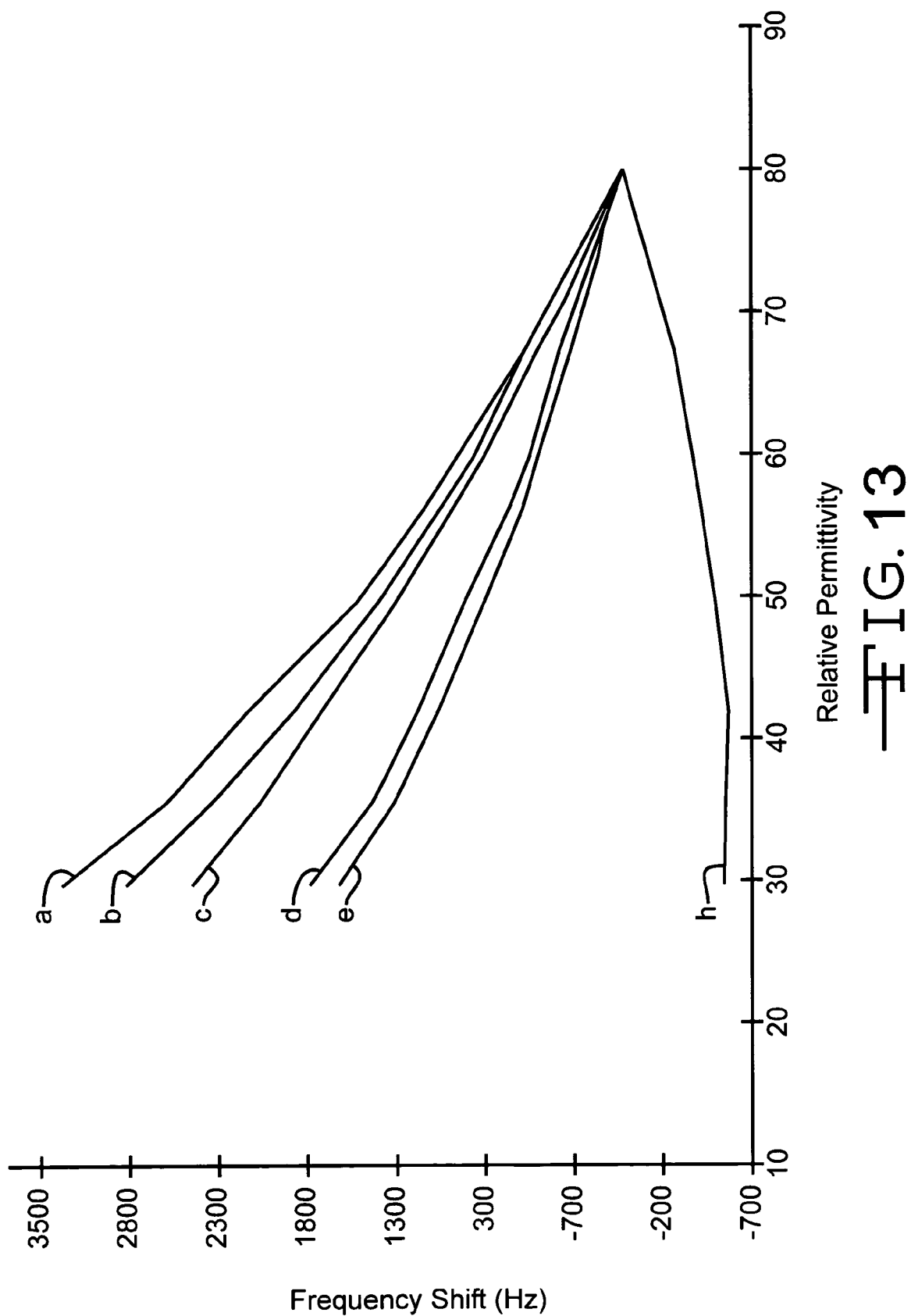
FIG. 13 a graph illustrating the frequency changes for the QCM and LFE sensors shown in FIGS. 1 through 7 as a function of the relative permittivity of 2-propanol water soultion.
Figure 14:
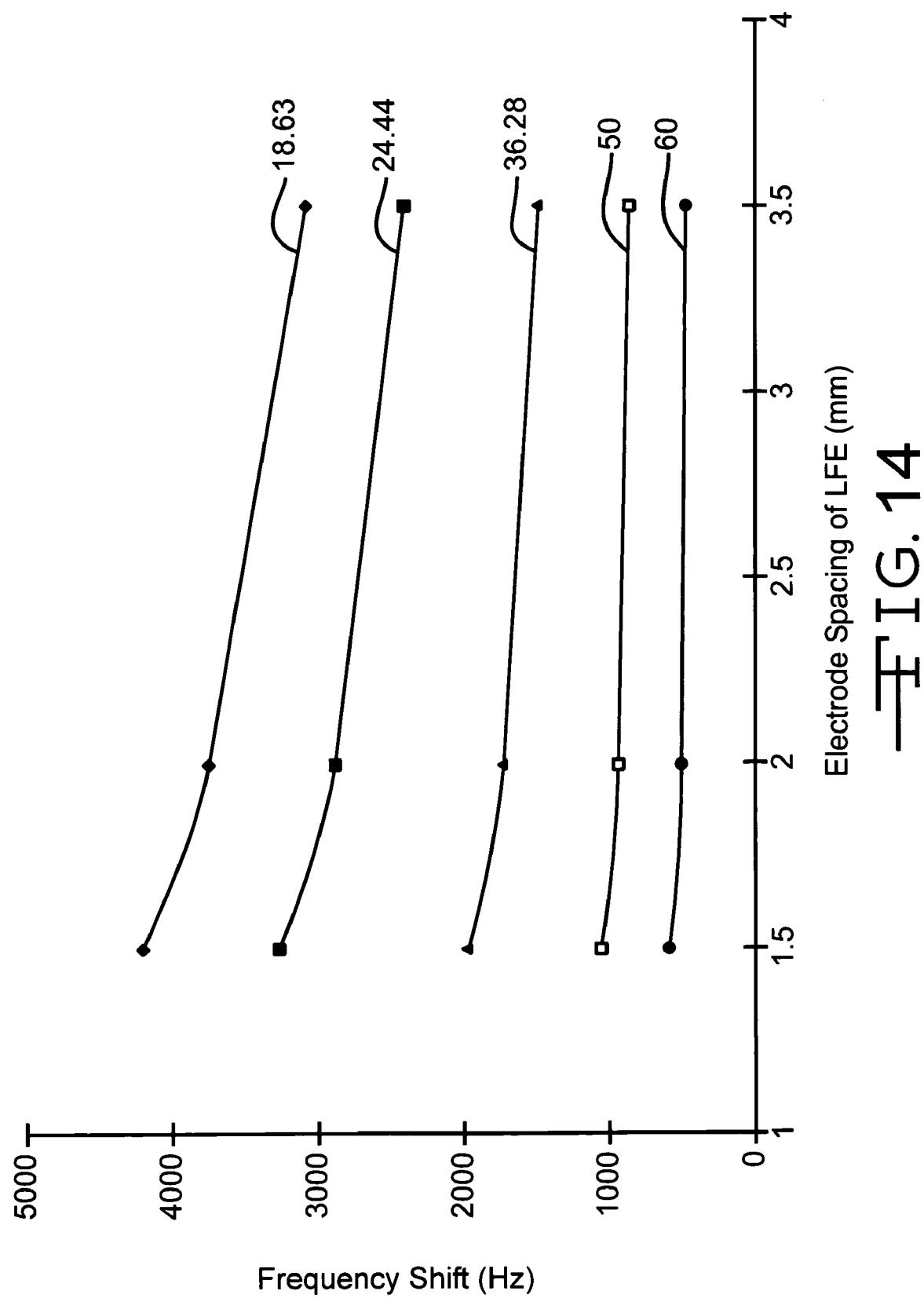
FIG. 14 is a graph illustrating the frequency shift for the LFE sensor shown in FIGS. 6 and 7 as a function of electrode gap spacing for different relative permittivities of 2-propanol water soultion.

The 2-propanol concentration can be converted to permittivity of the liquid. The inventor has done this and the frequency change of the devices as a function of the permittivity of the liquid is illustrated in FIG. 13. In FIG. 13, it is seen that the resonant frequencies of all of the sensors except the conventional QCM sensor decrease as the permittivity of the liquid increases. Furthermore, in the case of the LFE sensor, the sensitivity to changes in liquid permittivity decreases as the width of the gap 64 between the electrodes 60 and 62 increases, as shown by the curves in FIG. 14. As before, the permittivity of the liquid is indicated at the right end of each curve. Again, a smaller gap width results in a higher electric field associated with the TSM. As shown in FIG. 13, the performances of the four LFE sensors are superior to both the conventional QCM sensor and the various modified electrode QCM sensors. The average sensitivity of the LFE sensors is approximately 1.5 times that of the modified sensing electrode QCM sensors. Again, this result is due to the fact that the electrode free sensing surface of the LFE sensors allows the electric field associated with the TSM to fully penetrate into the liquid.

The third test was directed toward liquid viscosity measurements. During the test the LFE and QCM sensors were exposed to water solutions containing different amounts of glycerol. The viscosity of the solution was changed by varying the glycerol concentration.

Figure 15:
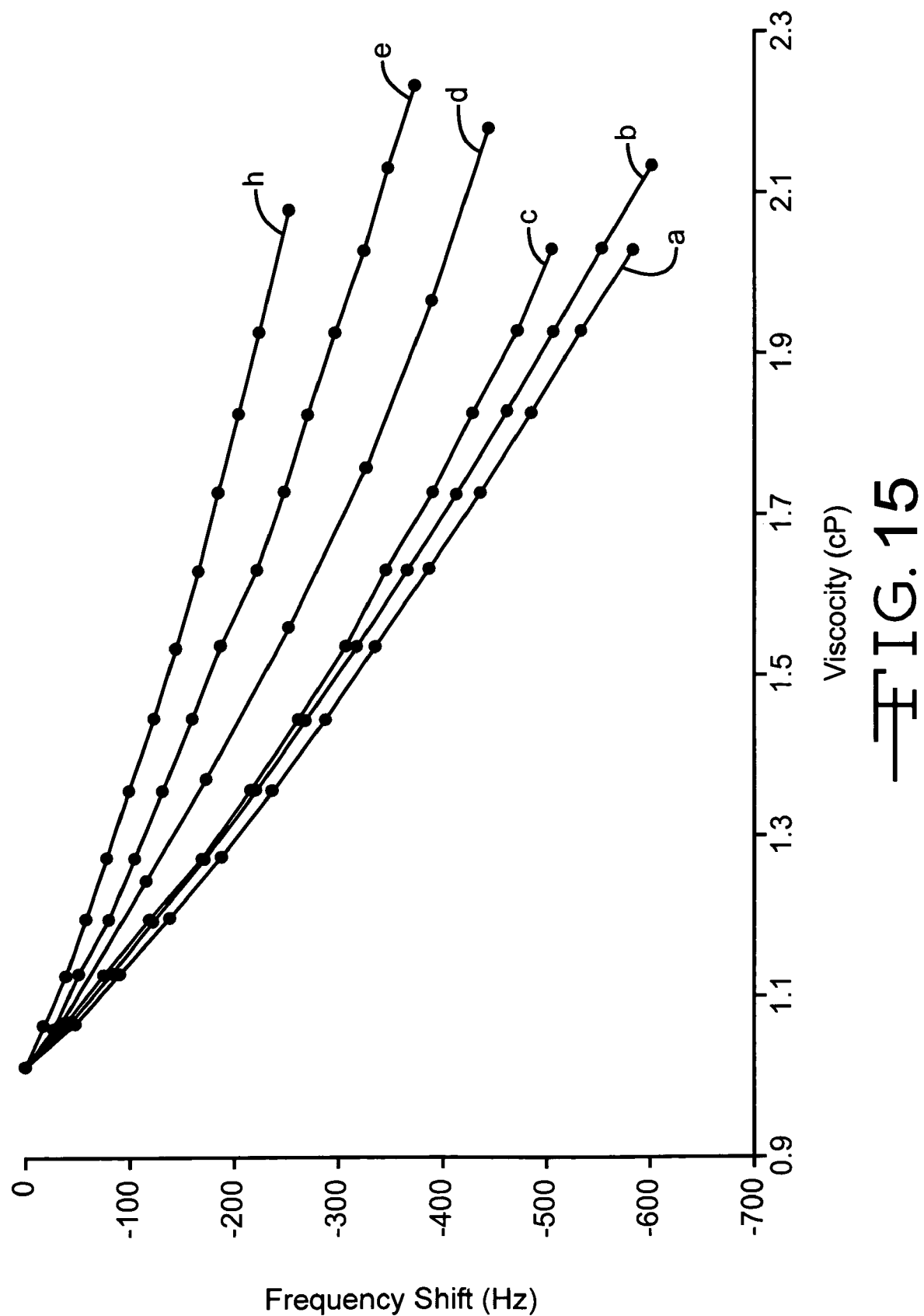
FIG. 15 is a graph illustrating the frequency shift for the QCM and LFE sensors shown in FIGS. 1 through 7 as a function of the viscosity of a water-glycerol solution.

The results of the viscosity measurement test are illustrated in FIG. 15 where the frequency shift from the resonant frequency in deionized water for each sensor is shown as a function of the viscosity of the solution. It can be seen that, for all of the sensors, the sensor resonant frequency decreases with increasing viscosity. For the LFE sensors, the sensitivity to viscosity increases as the width of the gap 64 between the electrodes 60 and 62 decreases. Compared to the results obtained from the conventional QCM sensor and modified sensing electrode QCM sensors, the sensitivities of the LFE sensors to changes in liquid viscosity are superior. The inventor believes that this is probably due to fact that the entire electrode free sensing surface of the LFE sensor is in contact with the liquid being measured. Thus, the mechanical energy of the TSM is not attenuated by the presence of electrodes. Generally, the sensitivities of the LFE sensors to viscosity are about 1.5 times that of the QCM sensors with modified electrodes and about 3 times that of the conventional QCM sensor.

It is known that the relative permittivity of a water-glycerol solution decreases as the glycerol concentration increases. According to the results shown in FIG. 13 for a 2-propanol water solution, the frequency change should increase with decreasing permittivity. Therefore, the inventor believes that the LFE sensors are more sensitive to changes in viscosity than shown in FIG. 15 due to the cumulative effects of the viscosity and permittivity of the liquid.

In summary, the inventor has found that LFE sensors in accordance with the present invention are more sensitive to the mechanical property of viscosity while also being able to detect changes in the liquid electrical properties of conductivity and relative permittivity of the contacting medium. The inventor found that the series resonant frequency of LFE sensors decreases as liquid conductivity and viscosity increases while the series resonant frequency increases with decreasing relative permittivity. The inventor further found that the LFE sensors in accordance with the present invention are significantly more sensitive than the modified sensing electrode sensors and the standard QCM sensor to both electrical and mechanical property changes in liquids. Accordingly, the inventor believes that the LFE sensor may have a wide range of liquid phase applications in the industrial, agricultural, biological, military, medical and homeland security fields.

Figure 16:
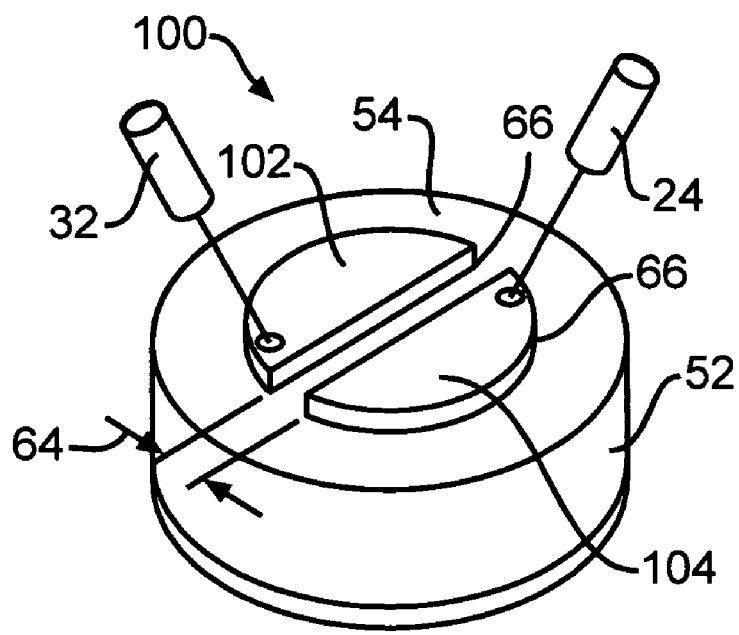
FIG. 16 is a perspective view of the reference surface of an alternate embodiment of the LFE sensor shown in FIG. 6.
Figure 17:
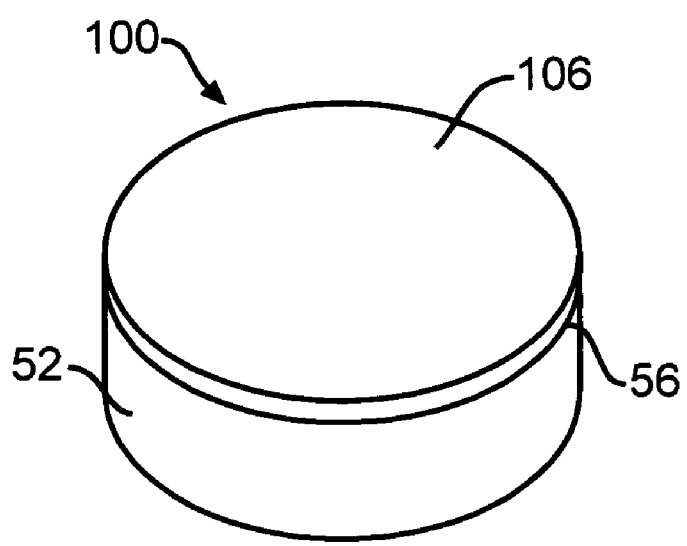
FIG. 17 is a perspective view of the sensing surface of an alternate embodiment of the LFE sensor shown in FIG. 6.

An alternate embodiment 100 of the invention is illustrated in FIGS. 16 and 17 where components that are similar to components shown in FIGS. 6 and 7 have the same numerical identifiers. While the sensor 100 is shown with a disc shaped substrate 52, it will be appreciated that the substrate also may have other shapes. As before, the substrate 52 is formed from a piece of piezoelectric material. The sensor 100 includes a pair of electrodes 102 and 104, separated by a gap 64. While the electrodes 102 and 104 are shown being shaped as sections of a circle, similar to the electrodes 60 and 62 shown in FIG. 6, the diameter of the circle is much smaller. Thus, the electrodes 102 and 104 do not cover most of the substrate reference surface 54, as was shown for the sensor 50 in FIG. 6. Also, the electrodes 102 and 104 may have other shapes than shown. As before, an adhesive layer 66 is deposited between the electrodes 102 and 104 and the sensor reference surface 54.

As best seen in FIG. 17, the sensor 100 also includes a sorbent layer 106 deposited upon the sensing surface 56. The sorbent layer is selected to absorb a specific measurand that may be present in the environment being sensed. In the preferred embodiment, the sorbent layer has a thickness of approximately 100 Å. As the measurand is absorbed into the sorbent layer 106, the mechanical and/or electrical properties of the sorbent layer change, causing a shift in the sensor resonant frequency, $f_s$. The shift in the resonant frequency is then correlated to a characteristic of the measurand. Thus, the sensor 100 may be used to detect the presence of a specific compound within either a gas or a liquid. For example, for when the measurand is a gas, namely $H_2S$, the sorbent layer would be formed from tungsten trioxide ($WO_3$) doped with gold.

The present invention also contemplates another alternate embodiment of the sensor that is similar to the sensor 100 shown in FIGS. 16 and 17, but that does not include the sorbent layer 106 (not shown). Such a sensor without the sorbent layer could be used to monitor the viscosity, dielectric constant and/or conductivity of a liquid, such as oil.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An acoustic wave sensor comprising:
   a substrate formed from a piezoelectric crystal with a crystallographic orientation, said substrate having a sensing surface and a reference surface, said reference surface being opposite from said sensing surface, said sensing surface in contact with a fluid containing a measurand of interest; and
   a pair of electrodes deposited upon said substrate reference surface, said electrodes separated by a gap and oriented upon said reference surface relative to said crystallographic orientation of said substrate such that, upon said electrodes generating a lateral electric field therebetween, said lateral electric field induces only a transverse shear mode acoustic wave within said substrate.

2. The sensor according to claim 1 wherein said substrate piezoelectric crystal is one of the group of quartz, langatate, langasite, langanite, lithium tantalate and lithium niobate.

3. The sensor according to claim 2 wherein said substrate is formed from an AT cut quartz.

4. The sensor according to claim 3 wherein said electrodes are formed with parallel facing edges that also are parallel with a crystallographic x-axis of said substrate such that upon excitation said electrodes generate an electric field that excites only transverse shear mode acoustic waves.

5. The sensor according to claim 4 wherein said electrodes are formed from one of the group of gold, platinum, palladium, silver, copper and aluminum.

6. The sensor according to claim 5 further including an adhesive layer formed from one of the group of chromium, zirconium, and titanium disposed between said electrodes and said reference surface of said substrate.

7. The sensor according to claim 6 wherein said gap between said pair of electrodes is within the range of 1.0 to 4.0 mm.

8. The sensor according to claim 7 wherein said substrate is circular in shape with a diameter within a range of 20 to 30 mm and a thickness within a range of 0.3 to 1.0 mm.

9. The sensor according to claim 8 wherein said electrodes have a thickness within the range of 1,500 to 2,500 Å and said adhesive layer has a thickness within the range of 50 to 150 Å.

10. The sensor according to claim 8 wherein said electrodes have a thickness that is less than 1,500 Å and said adhesive layer has a thickness that is less than 150 Å.

11. The sensor according to claim 7 wherein said sensing surface includes a layer of a sorbent material deposited upon said substrate, said sorbent material being selected to absorb a measurand contained within said fluid being sensed, said absorbed measurand changing an operative characteristic of the sensor such that the change in said operative characteristic can be correlated with said measurand.

12. The sensor according to claim 11 wherein said operative characteristic is the resonant frequency of the sensor.

13. The sensor according to claim 7 wherein said sensing surface is bare.

14. The sensor according to claim 1 wherein said fluid is a gas.

15. The sensor according to claim 1 wherein said fluid is a liquid.

16. A method for fabricating an acoustic wave sensor comprising the steps of:
   (a) providing a piezoelectric crystal;
   (b) forming the crystal into a substrate having a crystallographic orientation, the substrate including a reference surface and a sensing surface opposite from the reference surface, the sensing surface in contact with a fluid containing a measurand of interest; and
   (c) depositing a pair of electrodes upon the reference surface of the sensor substrate, the electrodes separated by a gap and oriented upon the reference surface relative to the crystallographic orientation of the substrate such that, upon the electrodes generating a lateral electric field therebetween, the lateral electric field induces only a transverse shear mode acoustic wave within the substrate.

17. The method according to claim 16 wherein step (a) includes selecting the piezoelectric crystal from the group of quartz, langatate, langasite, langanite, lithium tantalate and lithium niobate.

18. The method according to claim 16 further including between steps (b) and (c), depositing an adhesive layer upon the reference surface of the sensor substrate.

19. The method according to claim 16, wherein the electrodes formed in step (c) are formed one of the group of gold, platinum, palladium, silver, copper and aluminum and further wherein the electrodes are deposited upon the reference surface of the sensor substrate and over the adhesive layer.

20. The sensor according to claim 16 wherein said fluid is a gas.

21. The sensor according to claim 16 wherein said fluid is a liquid.

22. An apparatus for measuring a characteristic of an environment comprising;
   an acoustic wave sensor having a piezoelectric substrate formed from one of the group of quartz, langatate, langasite, langanite, lithium tantalate and lithium niobate, said substrate having a crystallographic orientation, the substrate also having a reference surface and a sensing surface opposite from said reference surface, said sensing surface in contact with a fluid that contains a measurand, and pair of electrodes deposited upon said reference surface of said substrate with said electrodes oriented relative to said crystallographic orientation of said substrate such that, upon said electrodes generating a lateral electric field therebetween, the lateral electric field induces only a transverse shear mode acoustic wave within said substrate;

a variable voltage supply electrically connected to said sensor electrodes and operative to cause said electrodes to generate a lateral electric field therebetween that produces transverse shear mode acoustic waves within said substrate that extend into said environment, said variable voltage supply having a variable frequency and being operative to sweep through a predetermined frequency range; and a device electrically connected to said sensor and operative to detect the resonance frequency of the sensor, said device being further operative to detect shifts in the resonant frequency caused by said measurand deposited upon said sensing surface varies and to correlate said resonant frequency shift with said measurand.

23. The apparatus according to claim 22 further including an adhesive layer formed from one of the group of chromium, zirconium and titanium deposited between said substrate reference surface and said electrodes.

24. The apparatus according to claim 23 wherein said fluid is a liquid and said measurand is the viscosity of said liquid.

25. The apparatus according to claim 23 wherein said fluid is a liquid and said measurand is the relative permittivity of said liquid.

26. The apparatus according to claim 23 wherein said fluid is a liquid and said measurand is the conductivity of said liquid.

27. The apparatus according to claim 23 wherein said fluid is a gas.

* * * * *